Oct. 23, 1951            E. H. LAND            2,572,358
MULTILAYER PHOTOGRAPHIC FILM UNIT CONTAINING A LIQUID AND
HAVING ONE LAYER MOVABLE WITH RESPECT TO ANOTHER LAYER
Filed July 15, 1950            2 SHEETS—SHEET 1
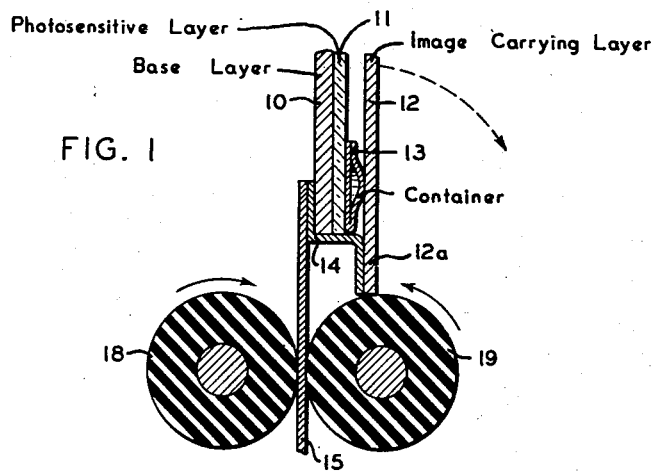
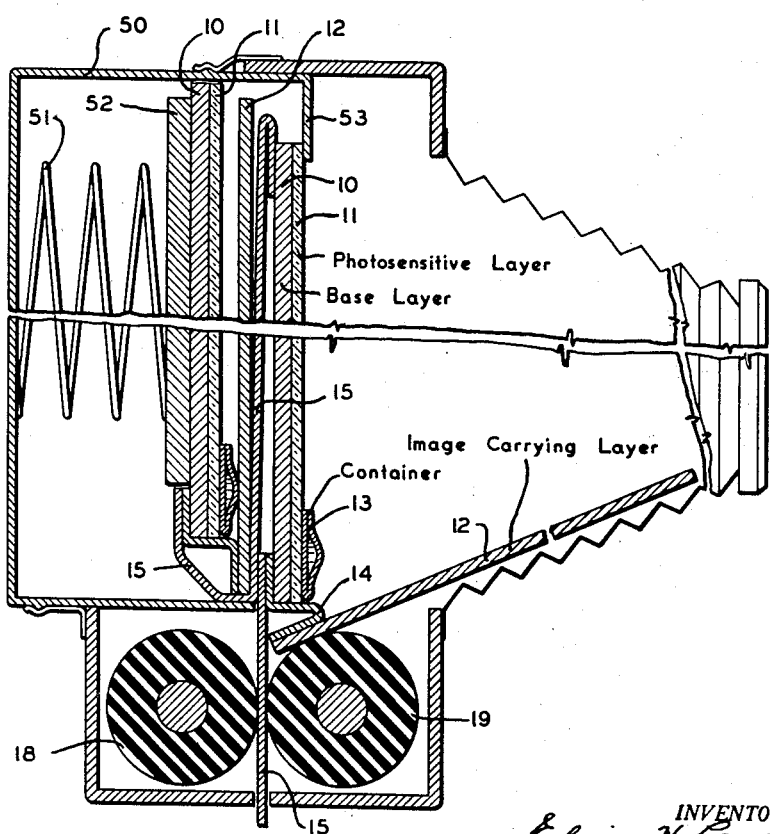
INVENTOR.
Edwin H. Land
BY Donald L. Brown
ATTORNEY Oct. 23, 1951　　　　　　　E. H. LAND　　　　　2,572,358
MULTILAYER PHOTOGRAPHIC FILM UNIT CONTAINING A LIQUID AND
HAVING ONE LAYER MOVABLE WITH RESPECT TO ANOTHER LAYER
Filed July 15, 1950　　　　　　　　　　　　2 SHEETS—SHEET 2
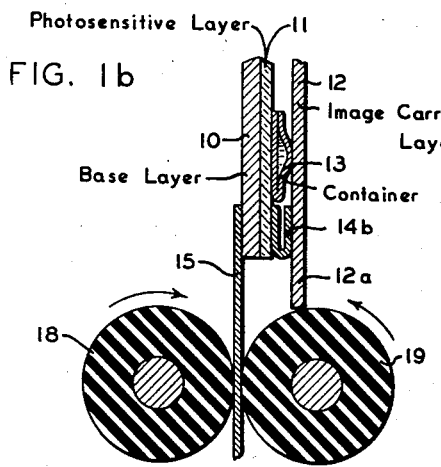
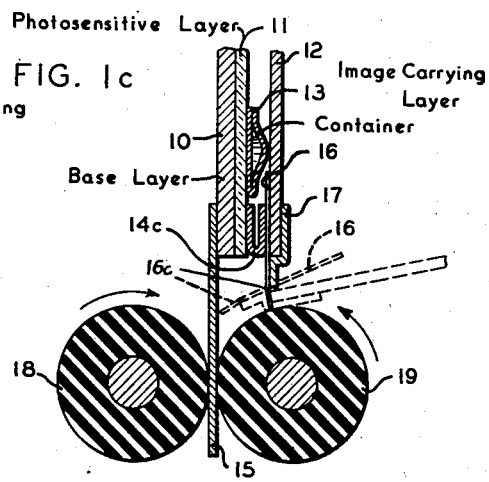
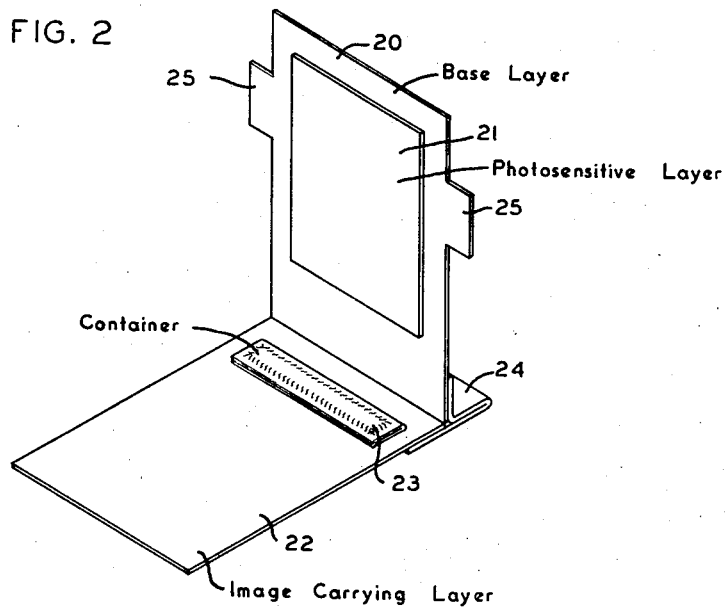
INVENTOR.
Edwin H. Land
BY Donald L. Brown
Attorney Patented Oct. 23, 1951

2,572,358

UNITED STATES PATENT OFFICE 2,572,358

MULTILAYER PHOTOGRAPHIC FILM UNIT CONTAINING A LIQUID AND HAVING ONE LAYER MOVABLE WITH RESPECT TO ANOTHER LAYER

Edwin H. Land, Cambridge, Mass., assignor to Polaroid Corporation, Cambridge, Mass., a corporation of Delaware Application July 15, 1950, Serial No. 174,026

12 Claims. (Cl. 95—8)

This invention relates to photography and more particularly to novel composite photographic films.

This application is a continuation-in-part of and a substitute for my copending application Serial No. 657,366, filed March 27, 1946, now abandoned, for A Multi-Layer Photographic Film Unit Containing a Liquid and Having One Layer Movable with Respect to Another Layer.

One object of the present invention is to provide a novel composite photographic film unit having a photosensitive layer and another layer, the layers being hinged together and having means adapted to be engaged by some device in a camera for causing the relative movement of the two layers, whereby the photosensitive layer may be exposed to actinic light and wherein there is provided a container for a liquid composition between the photosensitive layer and the other layer, said other layer being adapted to cooperate with said liquid composition and said photosensitive layer in the formation of an image in said film unit.

Still another object of this invention is to provide a novel composite film unit of the above type which is placed in a camera either alone or in combination with a number of other film units in a film pack, said film unit being sealed from actinic light and having means which will allow a photosensitive portion of said film unit to be uncovered for exposure to actinic light.

These and other objects of the invention will in part be obvious and will in part appear hereinafter.

For a fuller understanding of the nature and objects of the invention, reference should be had to the following detailed description taken in connection with the accompanying drawings, wherein:

Figure 1 is a partial sectional, more or less schematic view of a photographic film embodying one feature of the present invention;

Fig. 1a is a sectional schematic view showing the use of the invention of Fig. 1 in a camera;

Fig. 1b is a sectional view of a slightly modified embodiment of the invention described in Fig. 1;

Fig. 1c is a sectional view of a further modification of the invention shown in Fig. 1; and Fig. 2 is an exaggerated schematic view of another modification of the present invention.

In one form of the invention, there is provided a photosensitive layer and an image-carrying layer and between these two layers there is positioned a rupturable container or pod having therein a fluid as, for example, a liquid composition such as a photographic reagent. This liquid composition is preferably viscous and preferably contains therein a developer and a film-forming material. The liquid composition also preferably contains a substance which will react with the unexposed portions of the photosensitive layer to form therewith soluble image-forming components. When the container is ruptured such as by putting the assembly through a wringer, and the viscous liquid developing composition is spread between the photosensitive layer and the image-carrying layer, it will form an image-receiving layer. This image-receiving layer is created by the action of the film-forming substance which, during the processing of the composite film, is converted from a fluid to a solid. The positive image-forming complexes are transferred from the photosensitive layer to the image-receiving layer where the positive image is formed. In one modification of the above-described invention, the photosensitive layer may be stripped from the image-receiving layer to reveal the finished positive image.

Referring now to Fig. 1 of the drawings, there is shown a novel composite photographic film unit of a type comprising a base layer 10 carrying on one surface thereof a photosensitive layer 11. There is also provided another layer 12, which, in a preferred form of the invention, is an image-carrying layer. Between the photosensitive layer 11 and the image-carrying layer 12 there is provided a container 13 for the liquid composition. The container 13 may be attached to either layer 11 or 12. Connecting the photosensitive layer assembly, i. e., the base layer 10 and the photosensitive layer 11, with the image-carrying layer 12, there is provided a hinge 14.

In addition to the elements described above, there is shown a tab 15 which may be a portion of a means 15 connecting one film unit with another. As shown in Fig. 1, this tab runs between a pair of pressure rollers 18 and 19 adapted to rotate in opposite directions as shown by the arrows adjacent thereto.

The base layer 10 is preferably made of a suitable material adapted to hold a photosensitive emulsion on its surface. It can be paper or a cellulosic film base such as cellulose acetate, cellulose nitrate or cellulose acetate butyrate, and preferably contains therein a dye to make it opaque. It also preferably has an anti-halation coating thereon. The photosensitive layer 11 preferably comprises an emulsion of a silver halide or of a mixture of silver halides or of a mixed silver halide. The liquid composition in the container 13 preferably comprises a developer such as hydroquinone, a film-forming substance such as sodium carboxymethyl cellulose and a substance adapted to form, from a latent photosensitive image, positive image-forming components. This latter substance preferably forms soluble complexes with the unexposed silver halide and, in a preferred form of the invention, is sodium thiosulfate. There may also be included in this liquid composition other substances, such as a preservative and an alkali, and water to carry all of the above-named substances in solution. The container 13 is preferably formed of a substance such as an oxygen and water-vapor impervious material such, for example, as a sheet of wax impregnated metal coated paper or wax coated metal foil, or a metal foil coated with a resin, such as polyvinyl butyral, which is inert to alkalies.

The image-carrying layer 12 is preferably made relatively stiff so that a bending moment exerted on one end thereof will act to move the whole layer around a pivot point. This image-carrying layer can be formed of a relatively thick and stiff sheet of baryta paper, or it may be formed with several strata of material, one being a stiff substance such as glass and the other being a hardened gelatin coating thereon. The prime requisite of the physical characteristics of the image-carrying layer is that it be relatively stiff. The lower portion 12a of the layer 12 constitutes an engaging portion or means, whose function is to enable an opening force to be exerted on the film unit, as will be described in more detail later.

The hinge can be a thin sheet of cellulose acetate or a substance such as cellophane, suitably attached to the various layers by an adhesive. The tab 15 can equally be formed of the same materials as used in the hinge, or it can even be a continuation of the base layer 10.

Pressure rollers 18 and 19, which are a part of a camera mechanism, are preferably constructed of a relatively deformable substance such as rubber.

Turning now to Fig. 1a there is shown an exaggerated schematic cross-sectional view of a number of the film units of Fig. 1 arranged in a film pack within a camera. This film pack is contained within a housing 50 having therein a spring means 51, and a pressure plate 52, bearing upon the back of the rearmost film unit. The housing has a holding means, or lip, 53 on the front open portion thereof which is adapted to engage the film units and hold a photosensitive layer thereof in the focal plane of the camera. As shown in Fig. 1a the image-carrying layer 12 is somewhat shorter than the photosensitive layer assembly 10—11. Therefore, the image-carrying layer 12 may be released by holding means 53, while the photosensitive layer assembly is retained thereby. It can be seen from a study of Fig. 1a that, when a film unit is moved, by means of spring 51 acting on the back of the pack, to a position where the image-carrying layer is held by the lip 53, the film unit is in what might be described as an inoperative position. The whole film unit is then moved downwardly by the action of the rollers 18 and 19 upon the connecting strip 15. Fig. 1 shows the first portion of this movement and Fig. 1a shows the film unit in position for exposure.

The operation of the present invention is best understood by assuming that the film unit of Fig. 1 has been pulled from an inoperative position by means of the pressure rollers 18 and 19 acting upon the tab 15. As shown, the film unit has been pulled down so that the engaging portion 12a of the image-carrying layer 12 has just touched the roller 19. If the rollers 18 and 19 are now rotated very slightly in the direction shown by the arrows, a frictional force will be exerted upon the engaging portion 12a of the image-carrying layer 12 by the roller 19. This force will impart a turning moment to whole layer 12 and cause this layer to pivot around the container 13 from the position shown in full lines in Fig. 1 to the position shown in Fig. 1a. This movement is shown by the dotted arrow of Fig. 1. This will leave a predetermined image area on the surface of the photosensitive layer 11 free for exposure to actinic light. During exposure, the pressure rollers 18 and 19 are, of course, not moved.

After exposure, pressure rollers 18 and 19 are rotated and the film unit is pulled therethrough. In the process of passing through the pressure rollers, the container 13 is ruptured and the liquid composition is spread between the image-carrying layer 12 and the photosensitive layer 11. The developer in the liquid composition develops the latent image in the photosensitive layer and the sodium thiosulfate creates image-forming complexes with the unexposed silver halide. These complexes are then transferred to the image-receiving layer which has been created by the film-forming substance during its solidification. As the film unit is ejected from the camera, the image-carrying layer 12 is in light-excluding relationship with the photosensitive layer 11 and the image-receiving layer. The image-carrying layer, containing thereon the image-receiving layer, which, in turn, has therein the formed positive image, may be separated after a short time from the photosensitive layer assembly to reveal the final positive image.

In Fig. 1b a slight modification of the invention described in connection with Fig. 1 is illustrated. As shown, there is a base layer 10, having thereon a photosensitive layer 11. There is also shown an image-carrying layer 12. A container 13 for a liquid composition is preferably secured to the photosensitive layer 11. There is also shown a tab 15 like that of Fig. 1. Connecting the image-carrying layer 12 with the base layer 10 there is provided a relatively thick hinge 14b. As shown, this hinge is as thick as, or thicker than, the container 13. The image-carrying layer 12 has, as in Fig. 1, an engaging portion 12a which is adapted to engage a means, such as a pressure roller, and to have exerted thereupon a turning moment adapted to turn the whole image-carrying layer around a pivotal point. In this modification of the invention, the pivotal point is the hinge 14b, rather than the container 13. The operation of this modification of the invention is identical with that described in connection with Fig. 1 with the exception, however, that the image-carrying layer 12 will pivot around the hinge 14b rather than around the container 13 (of Fig. 1) as a pivot point.

Referring now to Fig. 1c, there is shown a partial sectional view of still another modification of the present invention. As in Fig. 1, there is included a base layer 10, a photosensitive layer 11, an image-carrying layer 12 and a container 13. Instead of the engaging means or portion 12a of Fig. 1, there is shown a relatively stiff member 16 having a curved portion 16c. The curved portion permits earlier contact between the member 16 and the roller 19. This member is preferably made of metal, and preferably has its lower edge serrated to increase the friction between said lower edge and roller 19. There is also provided a hinge 17, which joins the lower portion of the layer 12 with the lower portion of member 16. In addition to the elements described above, there is shown a relatively thick hinge 14c connecting the element 16 with the photosensitive layer, thus allowing the image-carrying layer to move relative to the photosensitive layer, the hinge 14c serving as a pivot point for the initial part of this movement.

It should be noted, in connection with the relationship of the stiff member 16 and the layer 12, that a clockwise turning moment applied to the member 16 will be transmitted throughout the layer 12. Due, however, to the hinged connection 17 between the layer 12 and member 16, this layer may continue to move in a clockwise direction after the turning moment applied from the member 16 has ceased. There is also shown, as in Fig. 1, a tab 15 adapted to pull the film unit through pressure rollers 18 and 19.

In the operation of the device of Fig. 1c, the film unit is pulled down, by means of the pressure rollers 18 and 19 and the tab 15, to the position shown in full lines. Further movement of the pressure roller 19 causes a frictional force to be exerted on the serrated lower end of the member 16c which imparts thereto a clockwise turning moment. This moment is transmitted to the layer 12, and the whole layer, including the member 16c, pivots around the hinge 14c as a pivot point. After the layer 12 has moved a certain amount under the influence of the turning moment, the force of gravity will continue the movement thereof, and the various elements will end up in the position shown by the dotted lines. As can be seen from a study of Fig. 1c, the hinged connected between the member 16 and the layer 12 enables the layer 12 to travel farther, in an angular direction, than the member 16, and thus assures that the layer 12 will be clear of the focal angle.

In Fig. 2, there is shown a partially schematic exagerated perspective view of another feature of the present invention. In this modification of the invention, there is provided a base layer 20 having thereon a photosensitive layer 21 which may be of the same size as the base layer. There is also included an image-carrying layer 22 and a container 23 adapted to have therein a liquid composition of the type described above. Connecting the photosensitive layer assembly with the image-carrying layer, there is shown a hinge 24. There are also shown several engaging means 25 which, in this particular modification of the invention, constitute tabs attached to or integral with the base layer 20. This feature of the invention contemplates a horizontal film pack with means in the camera for engaging the means on the photosensitive layer assembly and moving said assembly into the focal plane of the camera for exposure. It is also possible to place these tabs or engaging means on the image-carrying layer and to position the film unit in the focal plane in the camera. The engaging means in the camera would then engage the tabs on the image-carrying layer and move it out of the focal plane so as to expose the photosensitive layer to actinic light.

In connection with the modification of the invention shown in Fig. 2, it is to be understood that suitable materials shall be used in the construction thereof. The photosensitive layer, for instance, is preferably a silver halide emulsion of the type described above, and the image-carrying layer 22 is of a suitable material such as paper, baryta paper, etc. Of course, if the tabs or engaging means are placed on or within the image-carrying layer, that layer will be of sufficient thickness or backed by a material having sufficient rigidity to render said layer movable as a unit when a force is applied to one portion thereof.

The same general reasoning applies with respect to the base layer 20, which, if made of a cellulosic film base, is preferably stiffened somewhat by making the layer thicker or by placing a backing layer thereon of a relatively thick material. If this latter is done, the tabs may be formed integrally with the backing layer. Or it is possible to form the tabs out of a strip of metal which extends between such a backing layer and the base layer.

In the use of the film unit as shown in Fig. 2, the film unit is positioned horizontally in a camera either singly or as one of a number of similar film units in a film pack. As the film unit is positioned within the camera, the two halves thereof will lie in parallel planes. Lifting means are provided in the camera for contacting the engaging means 25 on the photosensitive layer assembly and move said photosensitive layer assembly 20—21 to the position shown in Fig. 2, where the photosensitive layer 21 lies within the focal plane of the camera. After exposure of the photosensitive layer, the film unit is processed as described in connection with the film unit shown in Fig. 1, by passing the whole film unit through pressure means such as rollers, the container end going first.

In all of the above discussion of the present invention, it has been assumed that there are means either within the camera, or connecting the various film units, if a plurality of the film units are employed, which will allow a film unit to be moved from an inoperative position to an exposure position. One such means is shown in my copending application Serial No. 594,892, filed May 21, 1945, wherein a plurality of film units of the general type shown in Fig. 1 are mounted upon a continuous strip which acts to position a film unit as the preceding film unit is removed from the camera. Another means is the connecting strip 15 shown in Fig. 1a of the drawings. It is possible also that these film units may be physically unconnected, but have engaging means which operate after one film unit has been removed from the exposure position, to position another film unit for exposure. Since this concept is not a part of the present invention, it will not be described herein.

It is obvious that the present invention can be practiced with a standard photographic film that does not contain a liquid composition therein, but a preferred use for my invention does contemplate the inclusion therein of such a liquid composition.

It is also contemplated by the present invention to use a liquid composition which contains no film-forming substance and which is not necessarily viscous. If such a liquid were used, the final positive image would be formed on and within the surface of the image-carrying layer.

A preferred form of the present invention contemplates the use of an opaque substance for both the base layer and the image-carrying layer so that the film unit, after passage through the pressure rollers, will be light-proof. Of course, a separate shielding element can be provided for the film unit as shown in application Serial No. 594,892 mentioned above. It is also possible to provide a light-proof chamber below the pressure rollers so that the film unit, after passage through the pressure rollers, will remain out of contact with light until the developing process has been completed.

In many of the above discussed figures, it is obvious that certain means must be provided for joining the parts together. These means can be adhesive layers which, for clarity of the basic principles of the invention, are omitted. It is also possible for the various layers in many cases to be formed of thermoplastic compositions which can be joined by heat and pressure.

In the various figures of the drawings, I have shown the components of the photographic material of the present invention as separate, distinct, and relatively thick layers. It should be understood that the relative thickness of these layers is shown only for illustrative purposes to clarify the invention. In actual practice, some of these layers are extremely thin, even to the point of being difficult to measure with the naked eye.

In the products hereinbefore described, there is provided a container 13 for carrying a liquid in such condition that the liquid may be readily released for the purpose of processing photosensitive layer 11. In the preferred embodiment of the product, photosensitive layer 11 is a silver halide emulsion or the like, that is, an emulsion of a heavy-metal-salt capable of having a latent image formed therein upon exposure, which latent image may be rendered visible by suitable silver halide developing agents. The liquid released from container 13 cooperates with the emulsion and with image-carrying layer 12 to carry out a transfer process. This transfer process involves the development of a latent image in the photosensitive emulsion and, in one preferred form, the removal from that emulsion of part at least of the undeveloped silver halide as a soluble complex, which soluble complex is transported from the photosensitive layer to form the positive print.

By so forming the products described hereinbefore as to omit therefrom the substance for forming the soluble complex, it becomes possible to only develop the photosensitive silver halide emulsion. Similarly, by eliminating the developer and, if necessary, increasing the concentration of the sodium thiosulfate or other substance for forming the soluble complex, it becomes possible to predeterminedly fix out a developed negative by means of the aforementioned liquid-containing products. It is believed to be also evident now that other developable photographic products may constitute the photosensitive layer 11 which is processed; and that the product may carry suitable developing agents and such other liquid as is necessary to render said agents operative to effect the development of the photosensitive layer.

Certain diazonium compounds are destroyed by light, and photographic processes involving such compounds as their photographic materials have been used commercially. There are several known ways in which a diazonium salt layer may be exposed and developed to produce a relatively stable image. In each of these processes the treatment of the photosensitive diazonium layer may be accomplished by applying thereto a liquid containing certain developing reagents. (L. P. Clerc, "Photography Theory and Practice," second edition, published 1937 by Pitman Publishing Company, page 444, paragraph 693.)

The products of the present invention may be used in conjunction with, or may comprise as elements thereof, diazonium photosensitive layers. For example, the photographic product may be formed by having any of the aforementioned physical structures and the photosensitive layer 11 of said product may have as its photosensitive substance a diazonium compound such as that sold by the Boston Blue Print Company under the name "Blackline #202," and the liquid reagent in the container 13 then preferably comprises, by weight, 4 parts of medium viscosity sodium carboxymethyl cellulose, 100 parts of water and 8 parts of "Blackline" Developer #203½ (sold by Boston Blue Print Company and manufactured by Frederick Post Company, Chicago). In the alternative, the photosensitive layer 11 may be obtained by applying to one side of a suitable sheet material a sensitizing solution which consists of 20 grams of chlorostannate of para-diazo-di-N-butyl-aniline, 0.4 gram of Pontacyl Brilliant Blue 2R, and 1 liter of water. The liquid developing reagent in the container 13 then preferably comprises, by weight, 4 parts of medium viscosity sodium carboxymethyl cellulose, 100 parts of water, 5.8 parts of sodium carbonate (monohydrate) and 2.3 parts of phloroglucinol.

The diazonium photosensitive layer may also be obtained by dipping a sheet of paper in a solution of Du Pont Naphthanil Diazo Black B, and the developing solution in container 13 may comprise 1500 parts, by weight, of a 5% water solution of sodium carboxymethyl cellulose, 10 parts of resorcinol and 1 part of sodium hydroxide.

It is also well known that certain ferric salts of organic acids, for example, the oxalates, tartrates, and citrates, are reduced to ferrous salts when exposed to light. (L. P. Clerc, "Photography Theory and Practice," second edition, published 1937 by Pitman Publishing Company, page 402, paragraph 621 et seq.; Crowley Patents Nos. 2,093,421, 2,113,423, 2,130,070, 2,130,071, 2,137,015.) A considerable number of photographic processes depend for their functioning on this photochemical phenomenon. It is known, in connection with these iron salts, that any reagent that will differentiate between ferric and ferrous salts can be used to develop the barely visible image formed by the photochemical reduction of the ferric salt into an image which is very easily visible. Examples of such developing reagents are potassium ferricyanide, potassium ferrocyanide, tannins, gallic acid, B-naphthoquinone-sulphonic acid, silver salts, platinum and palladium salts. It is believed to be now apparent to one skilled in the art that the photoresponsive ferrous salts may constitute the photosensitive material of the photosensitive layer 11, and the liquid in the container 13 may include or dissolve in its travel to the photosensitive layer any one of the aforementioned developing reagents for distinguishing between the ferric and ferrous salts and producing the easily visible image from the very light image that is originally obtained by the photoexposure of the iron salts.

Broadly, the products of the present invention may comprise, or may be used with, any photographic, photosensitive material for the purpose of developing the same. It is to be understood that the invention is not limited to materials sensitive to visible radiation but includes photographic, photosensitive materials sensitive to such other radiation as X-ray, ultraviolet, infrared or gamma radiation.

Since certain changes may be made in the above product and different embodiments of the invention could be made without departing from the scope thereof, it is intended that all matter contained in the above description or shown in the accompanying drawings shall be interpreted as illustrative and not in a limiting sense.

What is claimed is:

1. A photographic product containing material, including a photographic reagent, for producing a transformation of an image in said product, said reagent being present in an amount sufficient to effect said transformation, said product comprising a first liquid-confining layer, including at least a photographic, photosensitive portion capable of having an image formed therein upon photoexposure, a second liquid-confining layer, an opaque stratum associated with each of said liquid-confining layers, at least one of said layers being relatively stiff so as to transmit throughout substantially its whole area a turning moment applied thereto around an axis parallel to an edge portion of said layer, a rupturable container holding a liquid, said liquid being in an amount required for transforming said image in said photosensitive portion, said liquid upon permeation of said photosensitive portion rendering said transforming material effective to transform said image, said layers and container being attached together by means of a hinge, said liquid-confining layers being normally superposed with said photosensitive portion positioned between said opaque strata so as to exclude actinic light from said photosensitive portion, said hinge permitting said layers to be separated so as to allow exposure of said photosensitive portion and then permitting said layers to be superposed again, with said liquid being held by said container so as not to wet said layers and with said container being positioned for releasing said liquid between said layers, said photosensitive portion comprising a single frame for producing a single photographic image, said hinge being positioned adjacent a marginal edge of the frame, said container being also positioned adjacent a marginal edge of said frame, said hinge and said container being positioned outside of the boundaries of said frame so as not to interfere with exposure of said frame, and an engaging portion on said relatively stiff layer adapted to be engaged by means in a camera for causing said relatively stiff layer to pivot around said hinge with respect to the other layer so as to permit exposure of said photosensitive frame.

2. A photographic product containing material, including a photographic reagent, for producing a transformation of an image in said product, said reagent being present in an amount sufficient to effect said transformation, said product comprising a first liquid-confining layer, including at least a photographic, photosensitive portion capable of having an image formed therein upon photoexposure, a second liquid-confining layer, an opaque stratum associated with each of said liquid-confining layers, at least one of said layers being relatively stiff so as to transmit throughout substantially its whole area a turning moment applied thereto around an axis parallel to an edge portion of said layer, a rupturable container holding a liquid, said liquid being in the amount required for transforming said image in said photosensitive portion, said liquid upon permeation of said photosensitive portion rendering said transforming material effective to transform said image, said layers and container being attached together by means of a hinge, said liquid-confining layers being normally superposed with said photosensitive portion positioned between said opaque strata so as to exclude actinic light from said photosensitive portion, said hinge permitting said layers to be separated so as to allow exposure of said photosensitive portion and then permitting said layers to be superposed again, with said liquid being held by said container so as not to wet said layers and with said container being positioned for releasing said liquid between said layers, said photosensitive portion comprising a single frame for producing a single photographic image, said hinge being positioned adjacent a marginal edge of the frame, said container being also positioned adjacent a marginal edge of said frame, said hinge and said container being positioned outside of the boundaries of said frame so as not to interfere with exposure of said frame, an engaging portion on said relatively stiff layer adapted to be engaged by means in a camera, upon movement of said product with respect to said camera, for causing said relatively stiff layer to pivot around said hinge with respect to the other layer so as to permit exposure of said photosensitive frame, and means extending from one of said layers beyond said hinge for causing said movement.

3. A photographic product containing material, including a photographic reagent, for producing a transformation of an image in said product, said reagent being present in an amount sufficient to effect said transformation, said product comprising a first liquid-confining layer, a second liquid-confining layer, an opaque stratum associated with each of said liquid-confining layers, one of said liquid-confining layers including at least a photographic, photosensitive portion capable of having an image formed therein upon photoexposure, said first layer being relatively stiff so as to transmit throughout substantially its whole area a turning moment applied to a portion thereof around an axis parallel to an edge portion of said layer, a rupturable container holding a liquid, said liquid being viscous and a portion of said container being rupturable by increased hydraulic pressure within said viscous liquid, at least said second liquid-confining layer being sufficiently flexible to permit compression applied to outer surfaces of said product to be transmitted through said second liquid-confining layer for raising the hydraulic pressure in the contained liquid to the rupture point of the rupturable portion of the container, said liquid being in the amount required for transforming said image in said photosensitive portion, said liquid upon permeation of said photosensitive portion rendering said transforming material effective to transform said image, said layers and container being attached together by means of a hinge, said liquid-confining layers being normally superposed with said photosensitive portion positioned between said opaque strata so as to exclude actinic light from said photosensitive portion, said hinge permitting said layers to be separated so as to allow exposure of said photosensitive portion and then permitting said layers to be superposed again, with said liquid being held by said container so as not to wet said layers and with said container being positioned for releasing said liquid between said layers, an engaging portion on said relatively stiff layer adapted to be engaged by means in a camera, upon movement of said product with respect to said camera, for causing said relatively stiff layer to pivot around said hinge with respect to the other layer so as to permit exposure of said photosensitive frame, and means extending from one of said layers beyond said hinge for causing said movement.

4. The product of claim 2 wherein said photosensitive portion comprises a silver halide and said transforming material comprises a developer for exposed silver halide.

5. The product of claim 4 wherein said engaging portion constitutes a portion of said relatively stiff layer that extends beyond that side of said hinge farthest from said frame and said hinge is relatively thick to permit said engaging portion to be rotated towards said second layer.

6. The product of claim 4 wherein said first liquid-confining layer carries said container, said second liquid-confining layer is relatively stiff, and said container acts as a point for initial pivoting of said second layer.

7. The product of claim 4 wherein said first liquid-confining layer comprises a relatively stiff base sheet including a relatively smaller photosensitive layer secured thereto, said engaging portion comprising tabs on said base sheet extending laterally therefrom adjacent said photosensitive layer and being spaced from said hinge.

8. The product of claim 4 wherein said engaging portion constitutes a portion of said relatively stiff member hinged to both said layers so as to permit said member to transmit a turning moment to said relatively stiff layer and to permit said relatively stiff layer to continue turning after cessation of the transmittal of said turning moment, said member extending from said product beyond said hinge.

9. The product of claim 4 wherein said engaging portion constitutes a portion of said relatively stiff member hinged to both said layers so as to permit said member to transmit a turning moment to said relatively stiff layer and to permit said relatively stiff layer to continue turning after cessation of the transmittal of said turning moment, said relatively stiff member extending from said product beyond said hinge and having a serrated end.

10. The product of claim 2 wherein said liquid includes a film-forming material capable, when spread between said layers, of adhesively holding said two layers together in a light-tight lamination.

11. A film pack comprising a plurality of photographic products and magazine means for holding said products in a pack, each said photographic product containing material, including a photographic reagent, for producing a transformation of an image in said product, said reagent being present in an amount sufficient to effect said transformation, said product comprising a first liquid-confining layer, including at least a photographic, photosensitive portion capable of having an image formed therein upon photoexposure, a second liquid-confining layer, at least one of said layers being relatively stiff so as to transmit throughout substantially its whole area a turning moment applied thereto around an axis parallel to said layer, a rupturable container holding a liquid, said liquid being in the amount required for transforming said image in said photosensitive portion, said liquid upon permeation of said photosensitive portion rendering said transforming material effective to transform said image, said layers and container being attached together by means of a hinge, said liquid-confining layers being normally superposed with said photosensitive portion positioned therebetween, said hinge permitting said layers to be separated so as to allow exposure of said photosensitive portion and then permitting said layers to be superposed again, with said liquid being held by said container so as not to wet said layers and with said container being positioned for releasing said liquid between said layers, said photosensitive portion comprising a single frame for producing a single photographic image, said hinge and said container being positioned adjacent one marginal edge of said frame, said hinge and said container being positioned outside of the boundaries of said frame so as not to interfere with exposure of said frame, an engaging portion on said relatively stiff layer adapted to be engaged by means in a camera, upon movement of said product with respect to said camera, for causing said relatively stiff layer to pivot around said hinge with respect to the other layer so as to permit exposure of said photosensitive frame, and means extending from one of said layers beyond said hinge for causing said movement, said means for causing said movement of each product comprising a leader extending from one product to the next product, each said leader being sufficiently long to permit the complete removal of its preceding associated product from said magazine means and the processing of that product without causing a movement of its following associated product.

12. The film pack of claim 3 wherein the leader associated with each product is longer than either of the liquid-confining layers of its associated product.

EDWIN H. LAND.

REFERENCES CITED

The following references are of record in the file of this patent:

UNITED STATES PATENTS

| Number | Name | Date |
| --- | --- | --- |
| 1,972,424 | Medeger | Sept. 4, 1934 |
| 2,071,136 | Meinziger | Feb. 16, 1937 |
| 2,322,005 | Fierke et al. | June 15, 1943 |
| 2,322,006 | Fierke et al. | June 15, 1943 |
| 2,322,027 | Jelley et al. | June 15, 1943 |
| 2,315,373 | Land | Mar. 30, 1943 |
| 2,346,774 | Mahler | Apr. 18, 1944 |
| 2,362,593 | Stachle | Nov. 14, 1944 |
| 2,435,718 | Land | Feb. 10, 1948 |

FOREIGN PATENTS

| Number | Country | Date |
| --- | --- | --- |
| 369,146 | Germany | Feb. 15, 1923 |
| 370,821 | Germany | Mar. 8, 1923 |
| 328,762 | Great Britain | May 8, 1930 |
| 879,995 | France | Mar. 5, 1942 |